(12) United States Patent
Brändström (10) Patent No.: US 7,303,118 B2
(45) Date of Patent: Dec. 4, 2007

(54) CASH HANDLING APPARATUS HAVING DUAL FUNCTIONAL-KEY TYPE KEYPADS

(75) Inventor: Michael Brändström, Limhamn (SE)

(73) Assignee: Scan Coin Industries AB, Malmo (SE)

( * ) Notice: Subject to any disclaimer, the term of this patent is extended or adjusted under 35 U.S.C. 154(b) by 0 days.

(21) Appl. No.: 11/208,104

(22) Filed: Aug. 19, 2005

(65) Prior Publication Data

US 2006/0027643 A1    Feb. 9, 2006

Related U.S. Application Data

(63) Continuation of application No. PCT/SE2004/000355, filed on Mar. 11, 2004.

(60) Provisional application No. 60/453,614, filed on Mar. 11, 2003.

(30) Foreign Application Priority Data

Mar. 11, 2003    (SE)    .................................... 0300654

(51) Int. Cl.
*G06Q 40/00*    (2006.01)

(52) U.S. Cl. .................................... 235/379

(58) Field of Classification Search ................. 235/379
See application file for complete search history.

(56) References Cited

U.S. PATENT DOCUMENTS

| | | | |
|---|---|---|---|
| 5,943,655 A | 8/1999 | Jacobson | |
| 6,182,893 B1 * | 2/2001 | Greene et al. | 235/380 |
| 6,259,435 B1 * | 7/2001 | Matthews, Jr. | 345/172 |
| 6,443,359 B1 | 9/2002 | Green et al. | |
| 6,527,171 B1 * | 3/2003 | Brooks et al. | 235/379 |
| 2002/0017556 A1 * | 2/2002 | Putnam et al. | 235/379 |

FOREIGN PATENT DOCUMENTS

| | | |
|---|---|---|
| EP | 0 661 676 | 7/1995 |
| EP | 0 892 377 | 1/1999 |

OTHER PUBLICATIONS

Scan Coin AB 1991, Technical Manual, Cash Deposit System, Model CDS 600 & CDS 640, no month available.

(Continued)

*Primary Examiner*—Michael G. Lee
*Assistant Examiner*—Tae W. Kim
(74) *Attorney, Agent, or Firm*—Womble Carlyle Sandridge & Rice, PLLC (57) ABSTRACT

A cash handling apparatus has a user interface (26) which includes a main keypad (7) and a first functional-key-type keypad (5). The first functional-key-type keypad (5) has a plurality of functional keys (F1-F8) associated with functions or actions in the user interface. The user interface also includes a second functional-key-type keypad (6). Individual keys (F1'-F8') of the second functional-key-type keypad are associated with the same functions or actions in the user interface as are associated with corresponding individual keys (F1-F8) of the first functional-key-type keypad (5). Both of the first and second functional-key-type keypads (5, 6) are capable, during a user session of the cash handling apparatus, of receiving user input for selection among said functions or actions.

25 Claims, 4 Drawing Sheets

OTHER PUBLICATIONS

Scan Coin AB 1992, Manual, CDS 600/640 MIB Multi Interface Board, no month available.
Scan Coin AB, User's Manual, Scan Coin CDS 640, no date available.
Scan Coin AB, Technical Handbook, Scan Coin CDS 6XX Cash Deposit System, no date available.
Scan Coin AB 1991, Technical Manual, CDS MK 1 Coin Deposit System, no month available.
Scan Coin AB, User'Manual, CDS MK 1 Cash Deposit System, no date available.

* cited by examiner

CASH HANDLING APPARATUS HAVING DUAL FUNCTIONAL-KEY TYPE KEYPADS

CROSS-REFERENCE TO RELATED APPLICATIONS

This application is a continuation of international application no. PCT/SE04/000355, filed on Mar. 11, 2004; which application claims the benefit of Swedish patent application no. 0300654-1, filed on Mar. 11, 2003 and U.S. provisional patent application No. 60/453,614, filed on Mar. 11, 2003.

INCORPORATION BY REFERENCE

The specifications of PCT/SE04/000355, filed on Mar. 11, 2004; Swedish patent application no. 0300654-1, filed on Mar. 11, 2003, and U.S. provisional patent application No. 60/453,614, filed on Mar. 11, 2003 are incorporated herein in their entirety, by this reference.

FIELD OF THE INVENTION

The present invention relates to a cash handling apparatus of the type having a user interface which includes a main keypad and a functional-key-type keypad.

TECHNICAL BACKGROUND

Cash handling apparatuses are used for distributing and/or depositing cash, such as coins, bills and cheques.

One example of a cash handling apparatus is a cash distributing apparatus or automatic teller machine (ATM—known as Bankomat® in Sweden), which allows a user to automatically withdraw cash from e.g. a bank account and receive bills for the amount withdrawn. Another example is a cash deposit apparatus, which is used for depositing cash in the form of bills and/or coins to e.g. a bank account. Both kinds of apparatuses are typically stand-alone apparatuses which are used on a self-service basis by an arbitrary user. A cash deposit apparatus will be used in the following as a non-limiting example of a cash handling apparatus.

When using a typical cash deposit apparatus, a user places his cash in a cash reception area, whereby the cash deposit apparatus will count the cash, typically while discriminating the cash that is deposited, so as to only accept cash of certain predetermined type(s), while rejecting any other type of cash. The cash that is accepted is typically evaluated and counted, so as to determine the amount of cash that is deposited. Since the typical cash deposit apparatus is used on a self-service basis by an untrained user, the apparatus is provided with a user interface (man-machine interface) which is designed to facilitate operation of the apparatus by the user.

The user interface typically includes a display and a keypad, and, often, a printer, a speaker and a card reader. These elements of the user interface are controlled from a controller in the apparatus, such as a personal computer (PC) or another kind of microprocessor-based control system.

The keypad is typically a PIN-type keypad, having keys similar to those found on a telephone handset, for instance digits 0-9, "*", "#" as well as e.g. Backspace, Cancel and OK. In addition to this, there is often provided a functional-key-type keypad in the form of a set of functional keys having different predetermined functions in the various operating modes of the apparatus. Such functions keys are often positioned next to the display, for instance in two rows at either sides of the display.

Since the majority of all users of a typical cash deposit apparatus will use the apparatus in a standing position, the elements of the user interface are located at positions which are conveniently accessible from such a standing position. However, for people in wheelchairs and other handicapped individuals, such locations of the elements of the user interface may be less convenient.

U.S. Pat. No. 6,182,893 discloses a fuel dispensing apparatus which has been adapted for use by handicapped individuals by the provision of dual card readers and associated dual keypads. One of the card readers and one of the keypads are located at a vertically lower position than the other card reader and keypad. Thus, a handicapped individual may operate the fuel dispensing apparatus through the lower card reader and keypad in a position which is conveniently accessible from e.g. a wheelchair.

While U.S. Pat. No. 6,182,893 satisfies the need for providing access to a fuel dispensing apparatus for handicapped individuals, it nevertheless has some shortcomings that prevents full application of its teachings to a cash handling apparatus.

Firstly, both keypads in U.S. Pat. No. 6,182,893 include a set of PIN-type keys as well as a set of functional keys. While this may be appropriate in gas station environments which are typically outdoors with plenty of available space, it may pose a drawback in typical environments for cash handling apparatuses. More specifically, a cash handling apparatus is often used indoors at a location where floor space is limited. Thus, when trying to design cash handling apparatuses with a small foot print, two full-scale keypads may be difficult to accommodate.

Secondly, in U.S. Pat. No. 6,182,893 the two keypads are not true copies of each other. They do not have the same two-dimensional layout (rows and columns of keys), and certain keys are unique to one of the keypads and have no correspondence in the other keypad. To this end, an interface board, to which both keypads are connected, is designed to discriminate between input data from the two keypads and to attach identification information to the data so as to indicate the original source of the data. This identification information may be further used by a controller upon receipt of the input data from the interface board. The solution according to U.S. Pat. No. 6,182,893 has a drawback in that is represents a somewhat costly approach. Both the design of the keypads themselves and the circuitry for handling the aforedescribed input data discrimination add on to the total cost for the user interface. It is generally desired to design a cash handling apparatus with as minimal component costs as possible.

U.S. Pat. No. 6,443,359 discloses a similar solution. An automated banking transaction machine has a front customer panel (FIG. 32) including a plurality of vertically aligned user interfaces suitable for use in a drive-up environment for servicing customers in vehicles of varying height. Each user interface includes a full set of i/o devices in the form of a display, a keypad with alphanumeric keys and functional keys, and a card reader. A user selects one of the user interfaces by inserting a card in the associated card reader. Then, the transaction is carried out through the particular user interface thus selected. Hence, this is an expensive solution with many interface components, only a few of which are used for carrying out each particular transaction.

SUMMARY OF THE INVENTION

An object of the invention is to provide a cash handling apparatus which allows convenient access for individuals in a standing position as well as individuals in a sitting position, such as a handicapped individual in a wheelchair, or an individual in a motor vehicle, in a more efficient manner than in the prior art. Particularly, the invention seeks to provide a solution that uses a minimum of user interface components and that still offers a high degree of user-friendliness.

Another object of the invention is to further improve the user interface so that it suits the needs also for individuals with more than one handicap, for instance a disabled individual who also has a hearing impairment or reduced fine motor ability.

These objects are wholly or partially achieved by an apparatus and a user interface according to the appended independent claims. Preferred embodiments, and the objects, features and advantages thereof, are set forth in the dependent claims and in the following description and attached drawings.

Hence, according to one aspect of the invention, there is provided a cash handling apparatus having a user interface including a main keypad and a first functional-key-type keypad, said first functional-key-type keypad having a plurality of functional keys associated with functions or actions in said user interface. The apparatus also has a second functional-key-type keypad, wherein individual keys of said second functional-key-type keypad are associated with the same functions or actions in said user interface as are associated with corresponding individual keys of said first functional-key-type keypad, and wherein both of said first and second functional-key-type keypads are capable, during a user session of the cash handling apparatus, of receiving user input for selection among said functions or actions.

In one embodiment, the cash handling apparatus further includes: a controller for controlling said user interface; and means for receiving input from said first and second functional-key-type keypads and for generating, in response thereof, a control signal for said controller, wherein said means for receiving and generating is adapted to treat input from an individual key of said first functional-key-type keypad in exactly the same way as input from a corresponding respective individual key of said second functional-key-type keypad, without any discrimination of the origin of the input and so that no identification information as regards whether said input originates from said first or from said second functional-key-type keypad is included in said control signal.

The user interface of the cash handling apparatus may further include a display located at a first vertical level, wherein said second functional-key-type keypad is located at a second vertical level, lower than said first vertical level. The first functional-key-type keypad may comprise a set of keys which are positioned adjacently to said display substantially at said first vertical level. The main keypad may be located substantially at said second vertical level and may be a PIN-type keypad.

Advantageously, the second vertical level is no higher than 1200 mm from a ground level, whereas the first vertical level is higher than 1200 mm from the ground level.

The aforesaid arrangement has several advantages. By duplicating not the entire keypad equipment (main keypad plus functional-key-type keypad) but only the functional-key-type keypad, space as well as component costs are saved. The apparatus may be designed with a smaller foot print (floor surface area) but may nevertheless be used by handicapped people in wheelchairs or other persons in a sitting position thanks to the low location of the main keypad and the second functional-key-type keypad.

Moreover, since a vast majority of the users of the cash handling apparatus are likely to be non-handicapped people, making both of said first and second functional-key-type keypads capable of receiving user input during a user session will offer extended flexibility for such users, since they may freely choose between the two functional-key-type keypads when selecting said functions or actions. Thus, even if a user is using the apparatus in a standing position, the user will not be restricted to use one of the functional-key-type keypads only (i.e. the upper functional-key-type keypad) but may just as well use the other (lower) functional-key-type keypad, and even switch back and forth between the keypads during the user session.

Additionally, by not discriminating between the original of input for the functional-key-type keypads, the control of the user interface may be given a simplified and inexpensive design.

The cash handling apparatus may comprise a first auxiliary connector for an auxiliary output device suitable for disabled persons. Such an auxiliary output device may be a set of earphones.

The cash handling apparatus may further comprise a second auxiliary connector for an auxiliary input device suitable for disabled persons. Such an auxiliary input device may be a keypad, or a cursor control device such as a mouse or a joystick.

Advantageously, the first and second functional-key-type keypads are arranged in a genuine "dual command" manner, where the first and second functional-key-type keypads have the same number of functional keys, the same function assigned to pairs of keys consisting of one key from the first and one corresponding key from the second functional-key-type keypad, and the same arrangement in rows and columns for the keys.

Aforesaid means for receiving and generating may preferably be adapted to receive input also from said main keypad, and it may include an interface board.

The user session advantageously involves a cash handling transaction pertaining to the deposit and/or distribution of at least one of the following: coins, bills, cheques, coupons, vouchers, markers, and tokens.

Thus, the term "cash handling" is understood as handling liquid funds such as cash in the form of coins or bills, but also tokens, cheques, coupons, vouchers, markers and other items representing assets. The term "cash processing" is understood as processing such liquid funds, including, but not limited to, discriminating, counting, sorting, dispensing and storing liquid funds.

Another aspect of the invention is a user interface for a cash handling apparatus, comprising a combination of a main keypad, a first functional-key-type keypad, a second functional-key-type keypad and an output device such as a display, where the latter is adapted for indication, to a user, of a plurality of functions or actions for selection by said user. A function or action among said plurality of functions or actions is selectable by a key of said second functional-key-type keypad and by a corresponding key of said first functional-key-type keypad. All of said main keypad, said first functional-key-type keypad and said second functional-key-type keypad are capable, during a user session of the cash handling apparatus that involves a cash handling transaction, of receiving user input for selection among said functions or actions.

BRIEF DESCRIPTION OF THE DRAWINGS

The invention will now be described with reference to the appended schematic drawings, illustrating a cash deposit apparatus in one exemplifying embodiment of the invention.

DETAILED DISCLOSURE OF THE INVENTION

Figure 1:
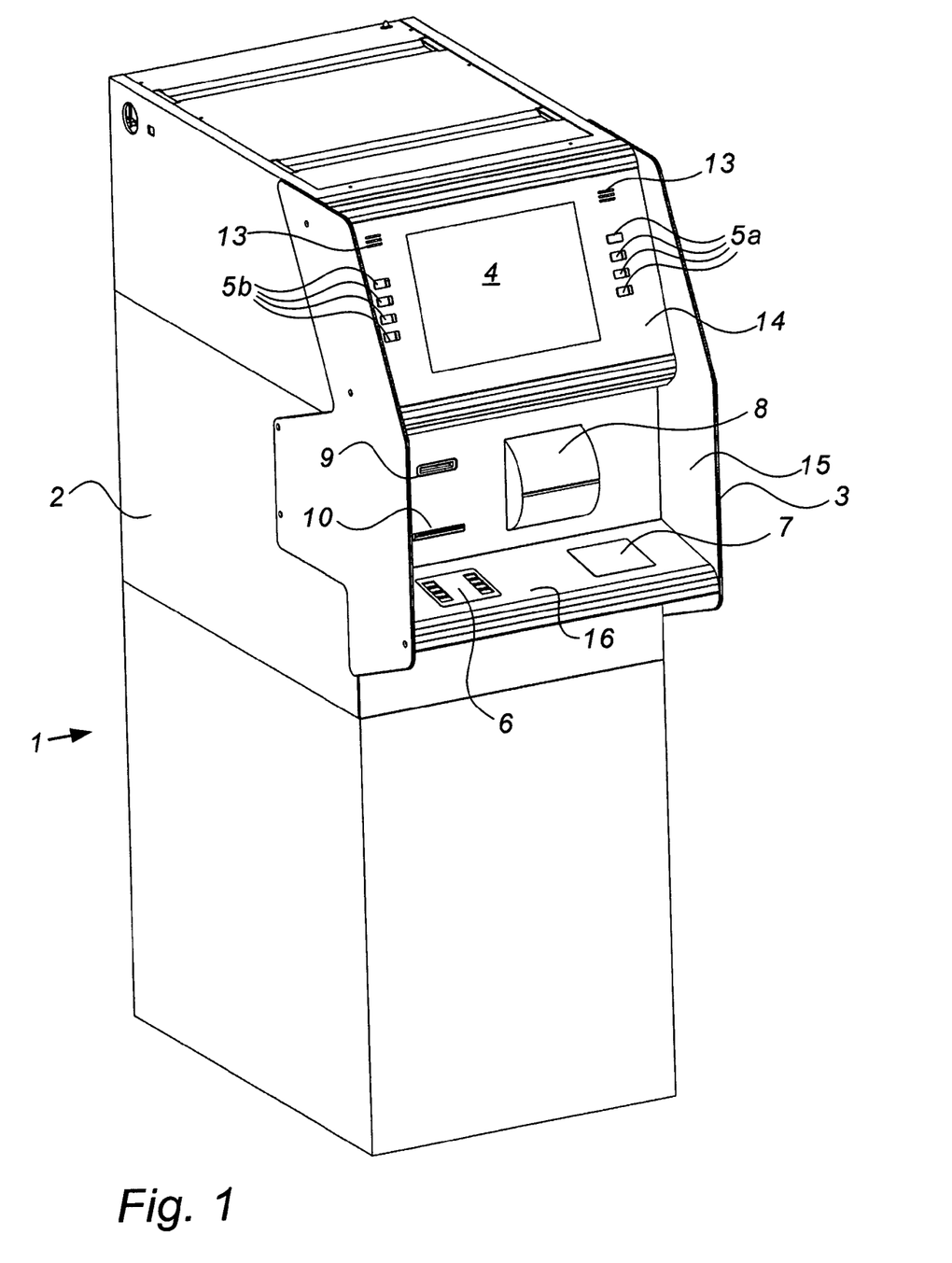
FIG. 1 is a schematic perspective view of the cash deposit apparatus.
Figure 2:
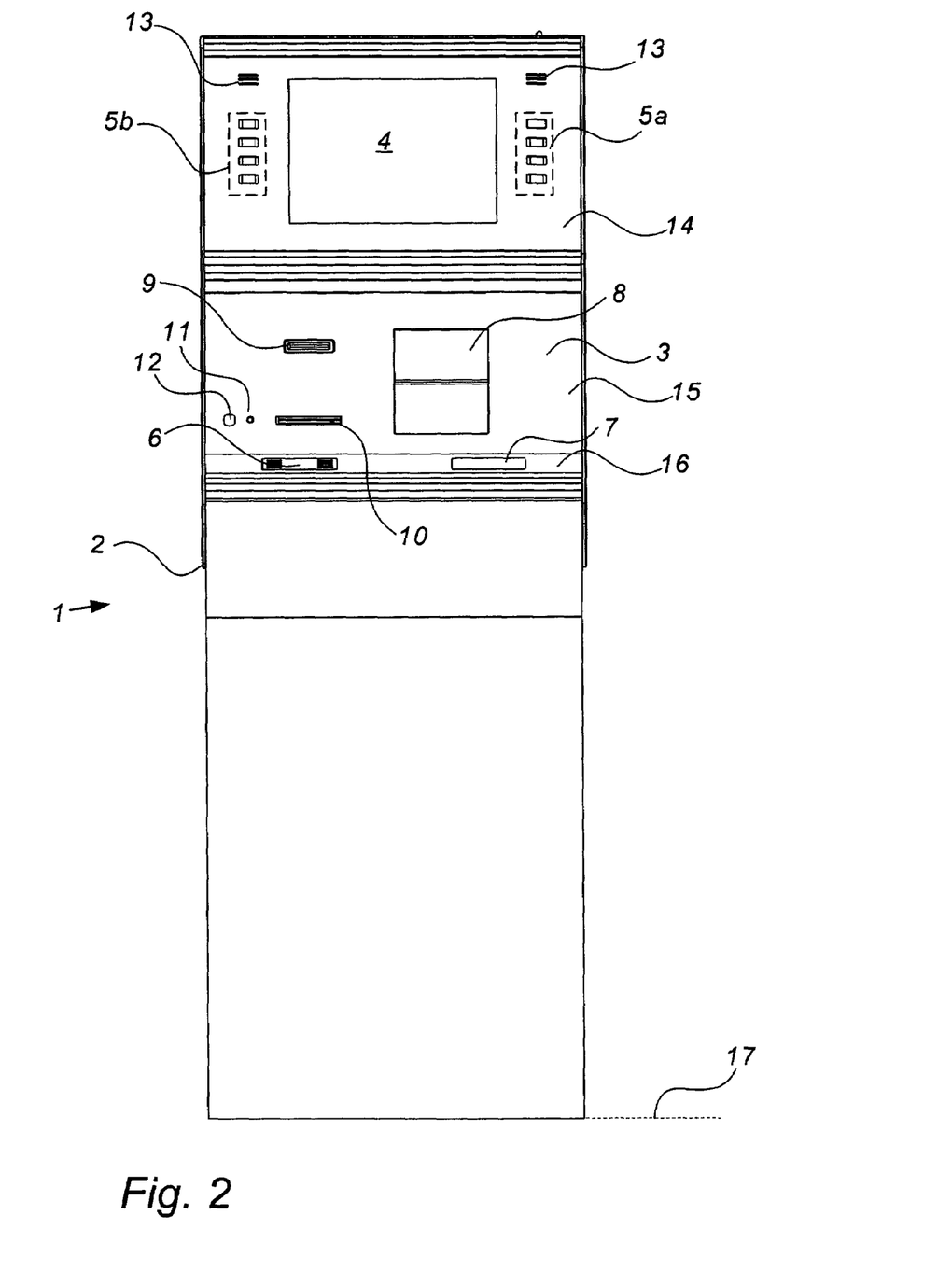
FIG. 2 is a schematic front view of the cash deposit apparatus.

The cash deposit apparatus 1 of FIGS. 1 and 2 comprises a cabinet or housing 2, in which all internal parts of the apparatus are contained. The apparatus 1 has a front surface 3 that contains a user interface towards a user of the apparatus. The user interface includes a display 4 which is located at a top portion 14 of the front surface 3. The display 4 is a TFT display, a CRT display or another kind of commercially available display. A first functional-key-type keypad 5 is provided next to the display 4 as two rows 5a, 5b of functional keys F1-F8 (see FIG. 4). Speakers 13 are provided at the upper corners of the front surface 3.

At a considerably lower vertical level, a second functional-key-type keypad 6 is provided on an inclined shelf 16. Just like the first functional-key-type keypad 5, the second functional-key-type keypad 6 comprises a set of functional keys F1'-F8' (see FIG. 4), disposed in two rows. A graphical handicap sign 51 marks the second functional-key-type keypad 6. Each functional key F1'-F8' of the second functional-key-type keypad 6 corresponds fully to a respective functional key F1-F8 of the first functional-key-type keypad 5. Thus, functional key F1' has exactly the same function as functional key F1, functional key F2' has exactly the same function as functional key F2, etc.

The shelf 16 also includes a main keypad 7 in the form of a PIN-type keypad. As seen schematically in FIG. 4, the main keypad 7 is formed by a matrix of 4×4=16 keys 7', representing digits 0-9, characters "*" and "#", as well as e.g. Backspace, Cancel and OK, all in a well known manner.

The shelf 16 is located at a vertical level which is low enough to be conveniently accessible for a individual in a wheel chair. Preferably, the shelf 16 is located no more than 1200 mm above ground level 17, whereas the top portion 14 is located higher than 1200 mm. Thanks to the low arrangement on the shelf 16, a handicapped user may operate the apparatus 1 through the keypads 6 and 7. Even if the display 4 is located higher, the information presented thereon is visible to a handicapped user. Advantageously, therefore, the type of display 4 is selected as one that provides a wide viewing angle, such as a TFT or CRT display, as already mentioned.

Figure 3:
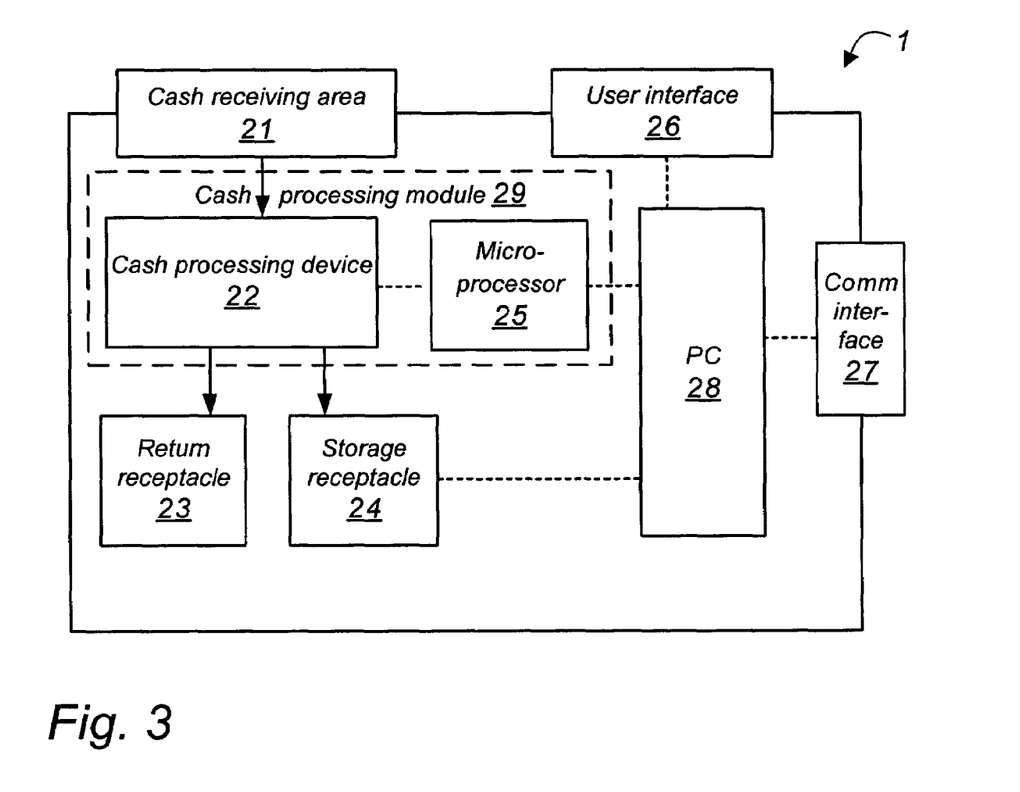
FIG. 3 is a block diagram of the cash deposit apparatus on a general level.
Figure 4:
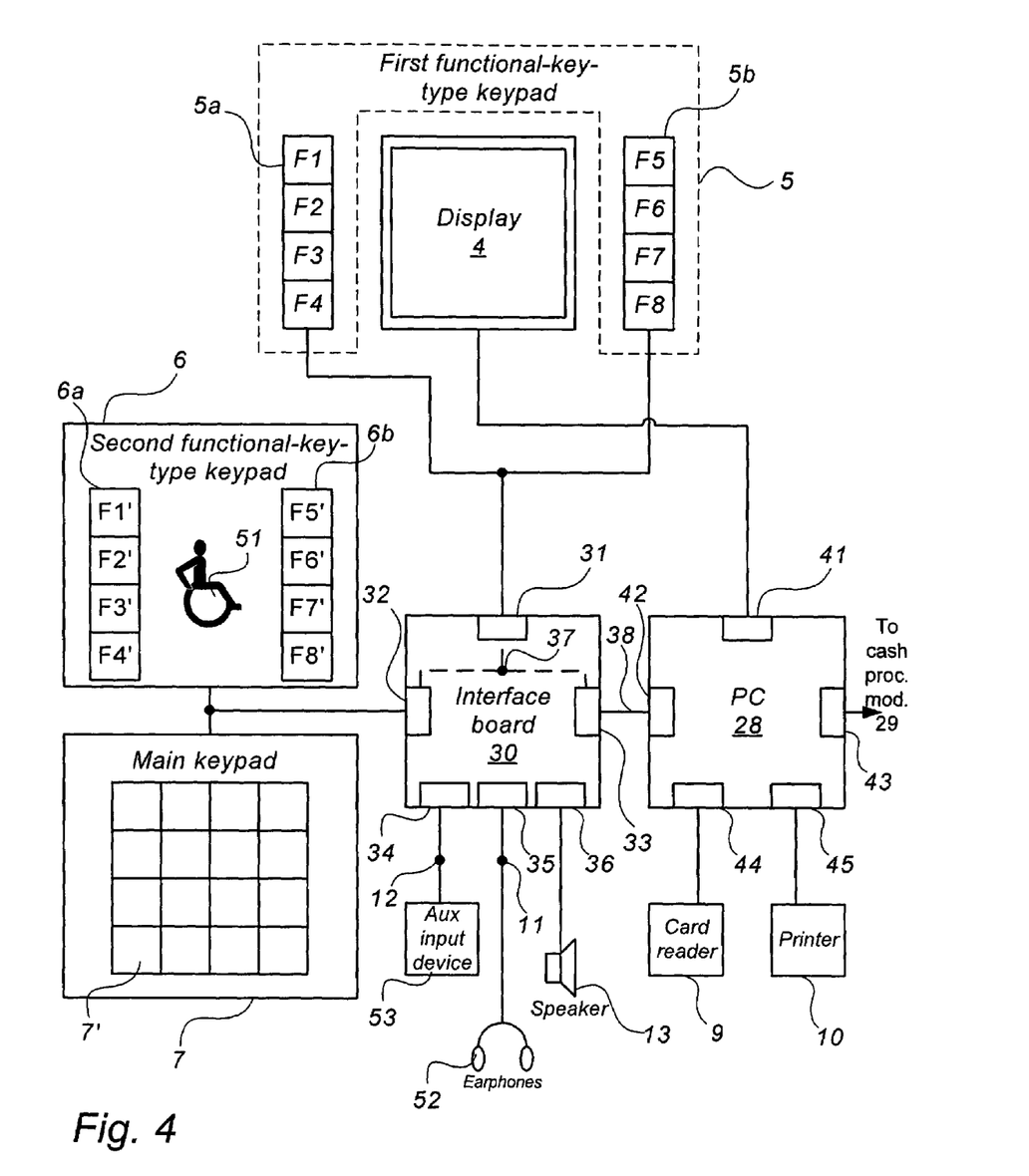
FIG. 4 is a detailed block diagram of the user interface part of the cash deposit apparatus.

A mid portion 15 of the front surface 3 comprises a pair of shutters 8 which constitutes a cash receiving area 21 (see FIG. 3). The mid portion 15 also has a card reader 9 and a receipt printer 10 (only the slots thereof are shown in FIGS. 1 and 2). As seen in FIGS. 2 and 4, the mid portion 15 further has two auxiliary connectors 11, 12. A handicapped user may carry his own accessory equipment to the apparatus 1 and plug it into connector 11 or 12. The first auxiliary connector 11 is adapted to connect an auxiliary output device to the apparatus 1, such as a set of earphones 52. Conversely, the second auxiliary connector 12 is adapted to connect an auxiliary input device 53 to the apparatus 1, such as an extra keyboard or a cursor control device like a mouse or a joystick.

Referring now to FIG. 3, the internal parts of the apparatus I include aforesaid cash receiving area 21 and a cash processing device 22 for discriminating and/or counting cash and thus selectively accepting cash that is acceptable for use in the cash deposit apparatus, and for counting the deposited cash. Rejected cash and other items may be conveyed to a return receptacle 23, while accepted cash is conveyed to a storage receptacle 24. The cash processing device 22 comprises means for discriminating cash based on e.g. size, shape, electrical, magnetic and/or optical properties. The cash processing device 22 is typically controlled by a special-purpose microprocessor 25, which is arranged to keep track of the counted cash, errors detected during counting, etc. Hence, the cash processing device 22 and the microprocessor 25 typically constitute a unit, which herein is referred to as a "cash processing module" 29.

The cash deposit apparatus 1 further comprises the user interface, jointly referred to as 26 in FIG. 3 but disclosed as individual members in FIG. 4.

A communication interface 27 allows interconnection between the apparatus 1 and a remote unit. The communication interface 27 includes a serial interface such as RS232, Universal Serial Bus (USB) or IEEE 1394 (Firewire®). Alternatively or additionally, it may include a network interface to a local and/or global network, such as a TCP/IP-based network like the Internet.

A controller 28 handles and controls the various functionality of the apparatus 1, including user interface 26 and communication interface 27, except for the internal operation of the cash processing module 29 which instead is controlled by the microprocessor 25. In the disclosed embodiment, the controller 28 is a personal computer (PC).

As seen in FIG. 4, the first functional-key-type keypad 5, the second functional-key-type keypad 6 and the main keypad 7 are all connected to an interface board 30 via terminals 31, 32. The different sources of input data from these keypads are combined, as seen at 37, into a common output signal 38 which is provided at terminal 33 of the interface board 30. A terminal 42 of the personal computer 28 is connected to terminal 33 so as to allow the personal computer 28 to receive data that has been input on any of the keypads 5, 6 and 7.

More specifically, as regards input from the two functional-key-type keypads 5 and 6, the interface board 30 does not discriminate between these two origins of input when providing the output signal 38 to the personal computer 28. Thus, no identification information about the origin of the input is provided by the interface board 30 to the personal computer 28, and the latter cannot discriminate between a first case when a certain input originates from an individual key (e.g. F3) of the first functional-key-type keypad 5, and a second case when the input originates from a corresponding individual key (e.g. F3') of the second functional-key-type keypad 6.

The interface board 30 has a terminal 36 to which the speaker 13 is connected. It also has a terminal 35 which is connected to aforementioned first auxiliary connector 11 at the front surface 3, and a terminal 34 connected to the second auxiliary connector 12.

The personal computer 28 has a terminal 41 connected to the display 4, a terminal 43 connected to the cash processing module 29, a terminal 44 connected to the card reader 9, and a terminal 45 connected to the printer 10.

The personal computer 28, including its terminals, may have an arbitrary design which is known per se and/or may be produced from commercially available components. It includes conventional components that are not shown in FIG. 4, such as a CPU, a RAM memory, a ROM memory, secondary storage such as a hard disk, as well as operating system software and application software. Together with the operating system, the application software will provide the various functions that are provided to a user of the apparatus 1 through the user interface 26 so as to use and control the apparatus 1. To this end, the functional keys F1-F8, and their replicates F1'-F8', will have various different functions depending on the operating mode of the apparatus and on the current stage of a transaction or operation.

For instance, the functional keys may be used to select a certain service—e.g. "Press F1 to deposit coins. Press F2 to deposit bills."

The functional keys may also be used to indicate whether to proceed or abort (e.g. "Press F3 to continue, F4 to exit", or "Continue? F3=Yes, F4=No").

Further, the functional keys may be used to select between predefined accounts (e.g. indicated by user information stored on an electronic, magnetic or optical card or other data carrier).

The functional keys may of course be used for many other examples than the ones given above.

While the present invention was described with reference to a cash deposit apparatus, it is realized that it may equally be applied to any cash handling apparatus, including any cash distributing apparatus. In this context, it is also understood that the cash processing module may comprise one or more of e.g. a coin counter/discriminator/sorter, a bill counter/discriminator/-sorter, a cheque counter/discriminator/sorter, a coupon counter/discriminator/sorter, a voucher counter/discriminator/sorter, a marker counter/discriminator/sorter and a token counter/discriminator/sorter.

Other embodiments than the one disclosed above are of course possible within the scope of the appended claims, as is readily realized by a person skilled in the art.

The invention claimed is:

1. A cash handling apparatus having a user interface including:
    a main pin-type keypad,
    a first functional-key-type keypad, said first functional-key-type keypad having a plurality of functional keys associated with functions or actions in said user interface, said first functional-key-type keypad being free of pin-type keys, and
    a second functional-key-type keypad having a plurality of functional keys associated with functions or actions in said user interface, said second functional-key-type keypad being free of pin-type keys,
    wherein each key of the plurality of functional keys of said second functional-key-type keypad has a respective corresponding key in the plurality of functional keys of said first functional-key-type keypad, and each key of said second functional-key-type keypad is associated with the same function or action in said user interface as its respective corresponding key of the plurality of functional keys of said first functional-key-type keypad, and
    wherein said first and second functional-key-type keypads have the same number of functional keys and the same arrangement of functional keys in rows and columns, and
    wherein both of said first and second functional-key-type keypads are capable, during a user session of the cash handling apparatus, of receiving user input for selection among said functions or actions; and
    said cash handling apparatus further comprising a controller for controlling said user interface; and
    an input interface for receiving input from said first and second functional-key-type keypads and for generating, in response thereof, a control signal for said controller, wherein said input interface is adapted to treat input from an individual key of said first functional-key-type keypad in exactly the same way as input from a corresponding respective individual key of said second functional-key-type keypad, without any discrimination of the origin of the input and so that no identification information identifying whether said input originates from said first or from said second functional-key-type keypad is included in said control signal.

2. The cash handling apparatus of claim 1, said user interface further including a display located at a first vertical level, wherein said second functional-key-type keypad is located at a second vertical level, lower than said first vertical level.

3. The cash handling apparatus of claim 2, wherein said first functional-key-type keypad comprises a set of keys which are positioned adjacently to said display substantially at said first vertical level.

4. The cash handling apparatus of claim 2, wherein said main keypad is located substantially at said second vertical level.

5. The cash handling apparatus of claim 2, wherein said second vertical level is no higher than 1200 mm from a ground level, and wherein said first vertical level is higher than 1200 mm from said ground level.

6. The cash handling apparatus of claim 1, wherein said main keypad is a PIN-type keypad.

7. The cash handling apparatus of claim 1, wherein said input interface is adapted to receive input also from said main keypad.

8. The cash handling apparatus of claim 7, wherein said input interface includes an interface board.

9. The cash handling apparatus of claim 1, further comprising a first auxiliary connector for an auxiliary output device suitable for disabled persons.

10. The cash handling apparatus of claim 9, wherein said auxiliary output device comprises a set of earphones.

11. The cash handling apparatus of claim 1, further comprising a second auxiliary connector for an auxiliary input device suitable for disabled persons.

12. The cash handling apparatus of claim 11, wherein said auxiliary input device comprises a keypad.

13. The cash handling apparatus of claim 11, wherein said auxiliary input device comprises a cursor control device such as a mouse or a joystick.

14. The cash handling apparatus of claim 1, wherein said user session involves a cash handling transaction pertaining to the deposit and/or distribution of at least one of the following: coins, bills, cheques, coupons, vouchers, markers, and tokens.

15. A user interface for a cash handling apparatus comprising:
    a single main pin-type keypad;
    a first functional-key-type keypad;
    a second functional-key-type keypad; and
    an output device adapted for indication, to a user, of a plurality of functions or actions for selection by said user, wherein a function or action among said plurality of functions or actions is selectable by a key of said second functional-key-type keypad and by a corresponding key of said first functional-key-type keypad, wherein all of said main keypad, said first functional-key-type keypad and said second functional-key-type keypad are capable, during a user session of the cash handling apparatus that involves a cash handling transaction, of receiving user input for selection among said functions or actions, wherein said first functional-key-type keypad and said output device are positioned near each other and at a vertical distance from said second functional-key-type keypad and said single main key pad, said first functional-key-type keypad and said second functional-key-type keypad each being free of pin-type keys, and wherein said first and second functional-key-type keypads have the same number of functional keys and the same arrangement of functional keys in rows and columns.

16. A cash handling apparatus having a user interface including:
- a main pin-type keypad,
- a first functional-key-type keypad, said first functional-key-type keypad having a plurality of functional keys associated with functions or actions in said user interface, said first functional-key-type keypad being free of pin-type keys, and
- a second functional-key-type keypad having a plurality of functional keys associated with functions or actions in said user interface, said second functional-key-type keypad being free of pin-type keys, wherein each key of the plurality of functional keys of said second functional-key-type keypad has a respective corresponding key in the plurality of functional keys of said first functional-key-type keypad, and each key of said second functional-key-type keypad is associated with the same function or action in said user interface as its respective corresponding key of the plurality of functional keys of said first functional-key-type keypad, wherein both of said first and second functional-key-type keypads are capable, during a user session of the cash handling apparatus, of receiving user input for selection among said functions or actions, and wherein said first and second functional-key-type keypads have the same number of functional keys and the same arrangement in rows and columns.

17. The cash handling apparatus of claim 16, wherein said main keypad is a pin-type keypad that is free from functional keys.

18. The cash handling apparatus of claim 17, wherein said main keypad has sixteen keys arranged in a 4×4 row/column arrangement.

19. The cash handling apparatus of claim 15, wherein said single main keypad is a pin-type keypad that is free from functional keys.

20. The cash handling apparatus of claim 19, wherein said single main keypad has sixteen keys arranged in a 4×4 row/column arrangement.

21. The cash handling apparatus of claim 1 wherein the first functional-key-type keypad includes two rows of functional keys and the second functional-key-type keypads includes two rows of functional keys.

22. The cash handling apparatus of claim 21 wherein each of the two rows of functional keys of each of the first functional-key-type keypad and the second functional-key-type keypad includes four functional keys.

23. The cash handling apparatus of claim 1 wherein the interface includes a plurality of key pads, which plurality consists of the main, pin-type keypad and a plurality of functional-key-type keypads, which plurality includes at least the first functional-key-type keypad and the second functional-key-type keypad.

24. The user interface of claim 15 wherein the interface includes a plurality of key pads, which plurality consists of the single main, pin-type keypad and a plurality of functional-key-type keypads, which plurality includes at least the first functional-key-type keypad and the second functional-key-type keypad.

25. The cash handling apparatus of claim 16 wherein the interface includes a plurality of key pads, which plurality consists of the main, pin-type keypad and a plurality of functional-key-type keypads, which plurality includes at least the first functional-key-type keypad and the second functional-key-type keypad.

* * * * *